July 28, 1970    J. J. BAHEN, JR., ETAL    3,522,362
ELECTRICAL POWER TRANSMISSION SYSTEM AND EXPANSION CONNECTOR
Filed Sept. 19, 1968    2 Sheets-Sheet 1
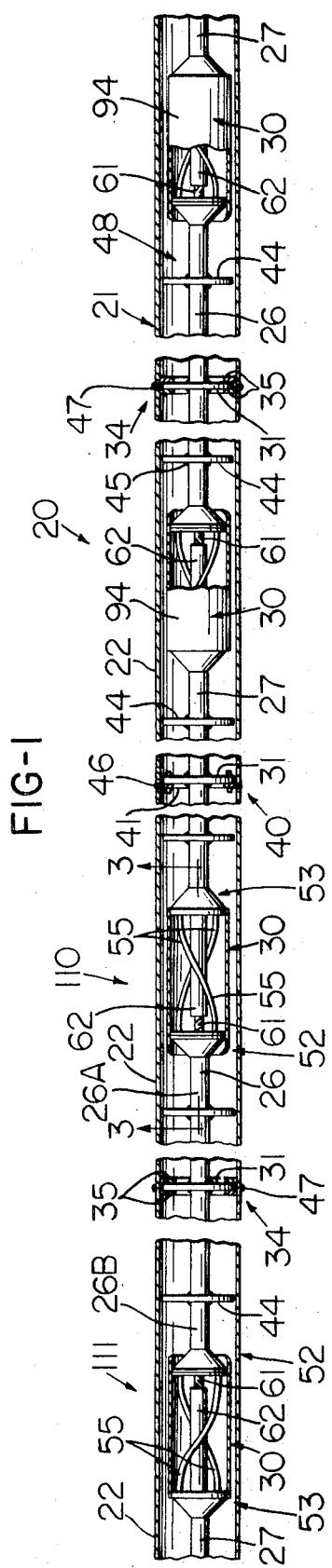
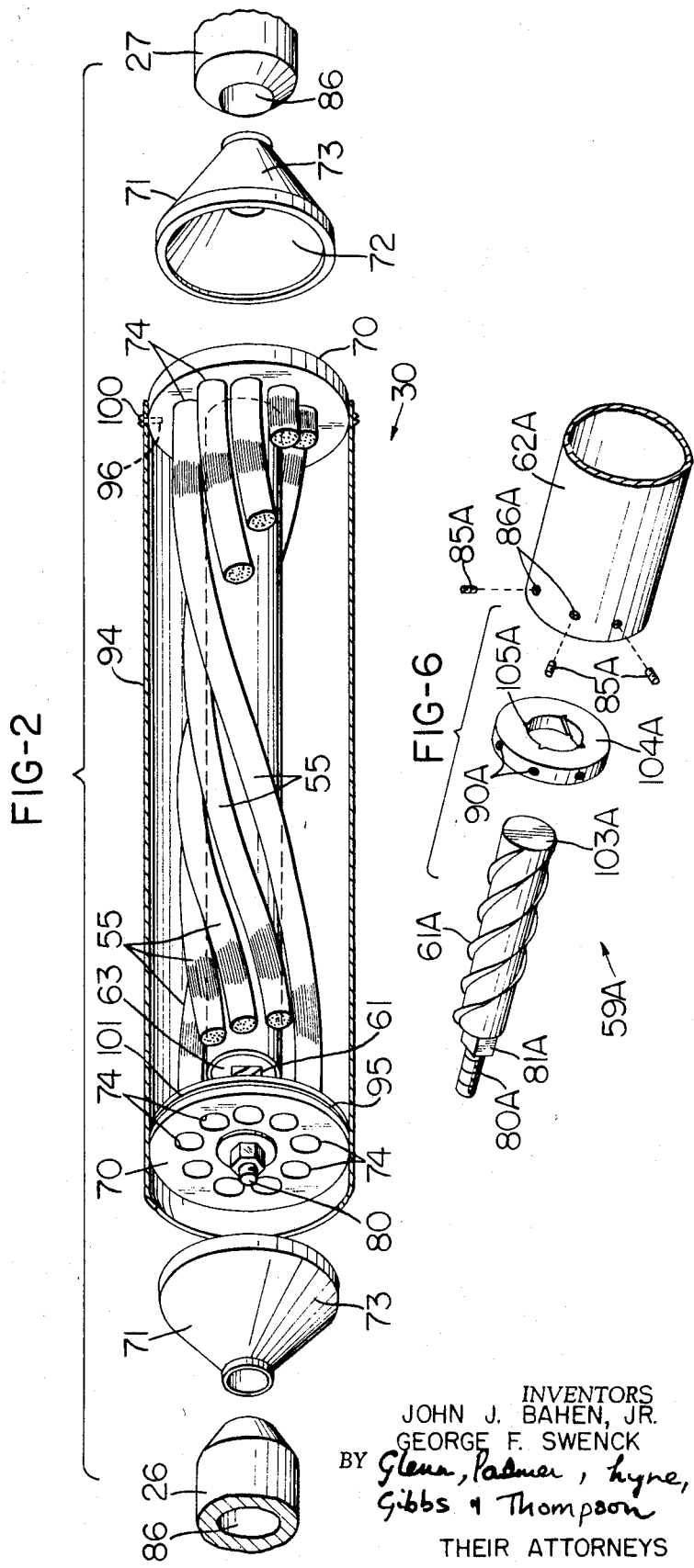
INVENTORS
JOHN J. BAHEN, JR.
GEORGE F. SWENCK
BY Glenn, Palmer, Lyne, Gibbs & Thompson
THEIR ATTORNEYS

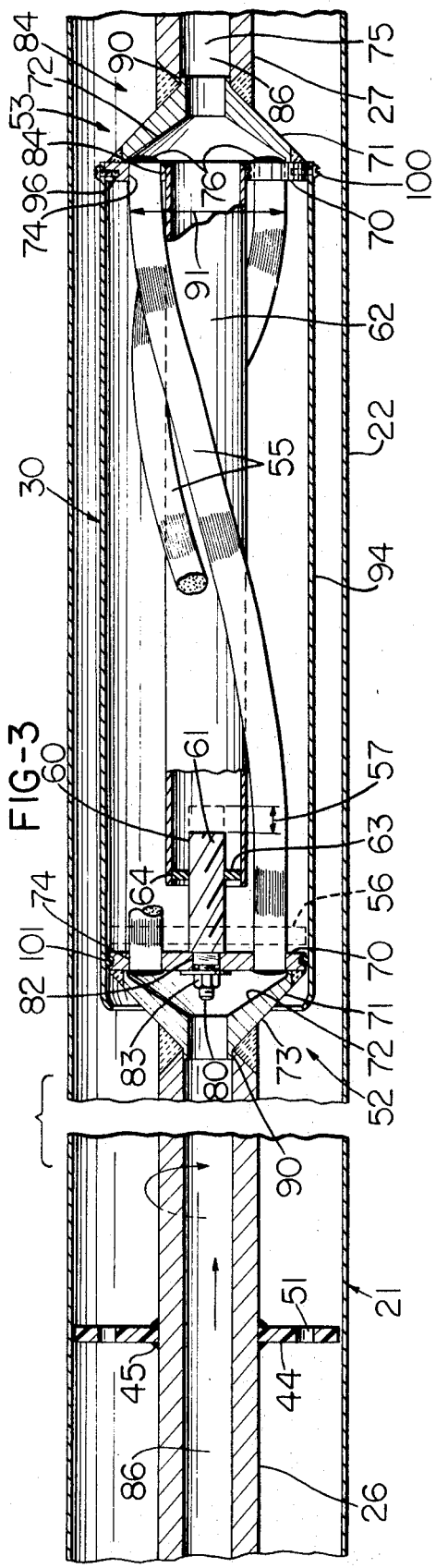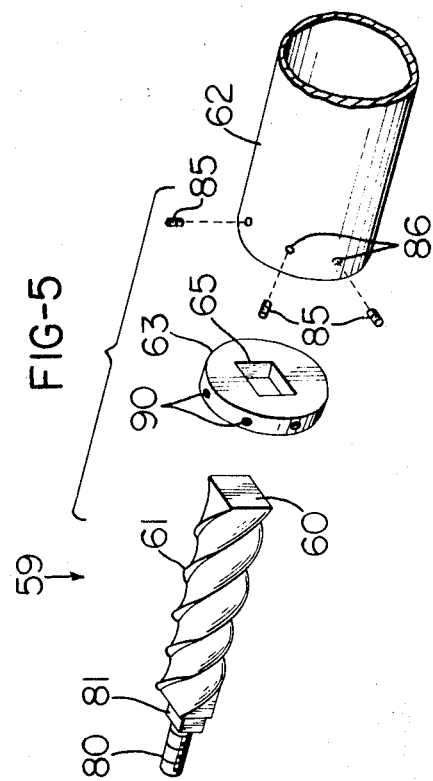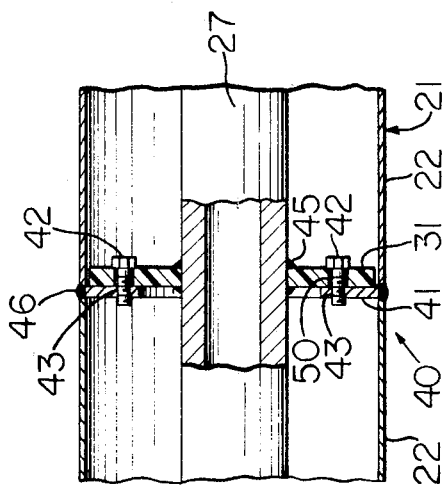

United States Patent Office 3,522,362
Patented July 28, 1970

3,522,362
ELECTRICAL POWER TRANSMISSION SYSTEM AND EXPANSION CONNECTOR
John J. Bahen, Jr., and George F. Swenck, Henrico County, Va., assignors to Reynolds Metals Company, Richmond, Va., a corporation of Delaware
Filed Sept. 19, 1968, Ser. No. 760,851
Int. Cl. H02g *15/24, 15/08*
U.S. Cl. 174—21
20 Claims

ABSTRACT OF THE DISCLOSURE

A connector for electrically connecting associated ends of a rotatable and a nonrotatable elongated electrical conductor wherein such connector has one support fixed to the rotatable conductor and another support fixed to the nonrotatable conductor, and the connector also has integral means for rotating the one support and its adjoining rotatable electrical conductor relative to the other support with relative axial movement of said rotatable and nonrotatable conductors to thereby modify the distance between the supports and compensate for such relative axial movement; and, an electrical power transmission system using such a connector.

BACKGROUND OF THE INVENTION

Electrical power transmission conductors used to transmit electrical power over great distances are subject to a wide range of temperatures causing large expanding and contracting movements thereof. In underground systems, for example, the conductors must be supported laterally within confined limits and such conductors expand and contract comparatively large amounts along their lengths. Accordingly, it is necessary to provide suitable connectors, commonly referred to as expansion joints, between adjoining end-to-end underground conductors to compensate for the large amounts of longitudinal expansion and contraction mentioned above. Each of the previously proposed expansion joints used in association with housed conductors is deficient in one or more of the following respects in that it is too expensive to produce and install, occupies too much space, has a comparatively large peripheral outline as viewed in cross section, does not provide an adequate current carrying capacity across the expansion joint, and has great rigidity which results in heavy loads in an associated system due to expansion and contraction.

SUMMARY

This invention provides a partially rotating connector, i.e., expansion joint, for electrically connecting associated ends of a pair of elongated electrical conductors which is of simple and economical construction, has a comparatively small peripheral outline as viewed in cross section, provides conductivity which is no less than the conductivity of its associated electrical conductors, and is comparatively freely expandible and contractible within such small peripheral outline in response to corresponding relative axial movement between such associated ends by positively converting a portion of such relative axial movement to relative rotation between opposite end portions of such expansion joint. This invention also provides an improved housed electrical power transmission system which provides efficient electrical power transmission while substantially eliminating undue stresses in the end-to-end electrical conductors relative to their associated protective conduit or housing.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show exemplary embodiments of this invention, in which FIG. 1 is a view with parts in section and parts broken away illustrating rotatable and nonrotatable electrical conductors suitably fastened in alternating end-to-end relation and with an exemplary rotating expansion joint of this invention fastened in position between associated ends of each rotatable and nonrotatable conductor and illustrating such conductors and expansion joints supported by associated spacers within an associated protective conduit of the type used in housed power transmission systems;

FIG. 2 is an exploded perspective view with parts in section and parts broken away particularly illustrating the component parts of an exemplary electrical expansion joint illustrated in FIG. 1;

FIG. 3 is an enlarged cross-sectional view with parts broken away taken essentially on the line 3—3 of FIG. 1 and particularly illustrating an expansion joint installed in position between a pair of associated electrical conductors;

FIG. 4 is a greatly enlarged cross-sectional view particularly illustrating a central insulating spacer fixed to an associated electrical conductor and to its associated protective conduit to define a nonrotating conductor;

FIG. 5 is an exploded perspective view illustrating one embodiment of integral rotating means comprising the expansion joint illustrated in FIG. 2; and FIG. 6 is an exploded perspective view illustrating another embodiment of integral rotating means which may comprise the expansion joint of FIG. 2.

DESCRIPTION OF ILLUSTRATED EMBODIMENTS

Reference is now made to FIG. 1 of the drawings wherein one exemplary embodiment of an electrical power transmission system of this invention is illustrated and designated generally by the reference numeral 20. The power transmission system 20 may be used in any application where it is desired to transmit electrical power through housed conductors and comprises an outer protective conduit or housing which is designated generally by the reference numeral 21 and is defined by a plurality of substantially identical cylindrical conduit sections 22 which are suitably fixed together in end-to-end relation. The sections 22 defining the outer protective conduit 21 may be fastened together in any suitable manner so as to provide a fluid-tight connection therebetween; however, in this example of the invention such conduit sections are shown as being welded together so as to provide a fluid-tight connection of high quality and optimum structural strength between adjoining conduit sections 22.

The exemplary electrical power transmission system 20 shown in FIG. 1 has a plurality of rotatable and nonrotatable elongated electrical conductors designated by the reference numerals 26 and 27, respectively, carried within the conduit 21 and each conductor 26 and 27 of this example of the invention has a cylindrical configuration. The power transmission system 20 has an exemplary embodiment of an electrical expansion joint which is designated generally by the reference numeral 30 and provided for electrically connecting associated ends of each rotatable conductor 26 and each nonrotatable conductor 27. The expansion joints at opposite ends of each rotatable conductor 26 have their component portions spiraled in opposite directions for reasons which will be discussed in detail subsequently; nevertheless, each expansion joint of the transmission system will be designated by the reference numeral 30 for simplicity and ease of presentation.

The power transmission system 20 has a plurality of central electrical insulating spacers 31 fixed to the central portion of each electrical conductor 26 and 27 and the central spacers 31 support their associated conductor within the protective conduit 21. Each spacer 31 is suitably held at an associated axial position within the conduit 21 to assure axial expansion and contraction of each electrical conductor 26 and 27 occurs in opposite directions from opposite sides of its central spacer 31.

In particular, it will be seen that each rotatable conductor 26 is held at a predetermined axial position along the conduit 20 between a pair of annular plates 35 fixed to the protective housing 21 and as indicated at 34. Each nonrotatable conductor 27 is also held at an axial position indicated at 40 by an annular plate 41 fixed to the protective conduit 21; and a plurality of fastening bolts 42 are threaded through cooperating threaded holes 43 provided in the annular plate 41. Thus, each nonrotatable conductor 27 is made nonrotatable by the bolts 42 fixing its associated central spacer 31 to a fixed annular plate 41 while the plates 35 allow rotation of the rotatable conductor 26 and its central spacer 31. It will also be appreciated that each central spacer 31 prevents its associated electrical conduit 26 or 27 from "creeping" or "walking" axially along the conduit 21 under conditions of differential expansion and contraction of the conductors 26 and 27 relative to the protective conduit 21.

The power transmission system 20 also has a plurality of intermediate electrical insulating spacers 44 fixed to the electrical conductors 26 and 27 and each spacer 44 is arranged between each central spacer 31 and an adjacent expansion joint 30. Each intermediate spacer 44 supports its associated conductor substantially centrally within the protective conduit 21 while allowing movement thereof both axially and rotatably with respect to the conduit 21.

The spacers 31 and 44 are made of an electrical insulating material and electrically insulate their associated conductors 26 and 27 from the conduit 21 which may be made of an electrically conductive material. Further, each spacer 31 and 44 may be fixed to its associated electrical conductor 26 or 27 in any suitable manner such as by using a suitable cement, by welding a bead adjacent each side of each spacer 31 and 44 and as shown at 45, or by fixing a pair of annular bands, or the like, to an associated conductor and on opposite sides of a particular spacer.

As seen in FIG. 1, each central spacer 31 associating with a nonrotatable conductor 27 is fixed to the annular plate 41 which may be welded adjacent the terminal end of an associated conduit section 22. Once the plate 41 is welded in position the associated central spacer 31 is fixed thereagainst by the bolts 42 and an adjoining conduit section 22 is then fastened in position as by a weld 46.

Similarly, the central spacer 31 associating with each rotatable electrical conductor 26 is arranged between associated annular plates 35 which have been suitably fixed, as by welding, adjacent associated terminal ends of a pair of conduit sections 22 which are placed in abutting end-to-end relation whereupon the abutted ends of the conduit sections 22 are welded together by a weld 47. However, there is sufficient spacing between the outside surface of the central rotatable spacer 31 and an immediately adjacent annular plate 35 to allow substantially unobstructed rotation of the rotatable electrical conductor 26.

The power transmission system 20 utilizing the exemplary expansion joint 30 preferably utilizes an electrically nonconductive (i.e., electrical insulating) fluid such as an inert gas, for example, under pressure which is carried within the protective conduit 21 so that it fills the volume between each electrical conductor and expansion joint and the outer protective conduit 21. This utilization of an inert gas under pressure helps to assure the provision of maximum electrical insulation along the full length of each electrical conductor 26. Further, the use of an electrical insulating fluid also serves to dissipate heat away from the conductors 26 and 27 and the expansion joints 30 and thereby helps to cool these components.

To assure that the inert gas indicated generally by the reference numeral at 48 in FIG. 1 is free to flow along the full length of the protective conduit 21, each spacer 31 and 44 has a plurality of opens 50 and 51 respectively provided therein and the openings 50 and 51 assure unobstructed flow of the inert gas along the full length of the protective conduit 21. The openings 50 and 51 may be provided in their associated insulating spacer in any desired geometric configuration.

Having described in general terms the electrical power transmission 20 with its protective conduit 21, electrical conductors 26 and 27, spacers 31 and 44, and expansion joints 30 between associated ends of each rotatable conductor 26 and nonrotatable conductor 27; the description will now proceed with a detail description of the exemplary expansion joint 30 and particular reference is made to FIGS. 2 and 3 of the drawings.

The expansion joint 30 has a pair of spaced supports designated generally by the reference numerals 52 and 53 and each fixed to an associated electrical conductor. In particular, the support 52 is fixed to a rotatable conductor 26 and the oppositely arranged support 53 is fixed to a nonrotatable conductor 27. The expansion joint 30 has a plurality of elongated electrical leads 55 having their opposite ends fastened to the spaced supports 52 and 53 and each electrical lead is initially arranged in a helical pattern having a given pitch. The expansion joint 30 also has means for rotating one of the supports, shown as the support 52 in FIG. 3, and its adjoining rotatable electrical conductor 26 relative to the support 53 and its nonrotatable conductor 27 with relative axial movement of the adjacent terminal ends of the associated conductors 26 and 27 to modify the distance between the supports 52 and 53 and cause the pitch in the helical pattern of the electrical leads 55 to vary as a function of the distance between the supports 52 and 53 and thereby compensate for the relative axial movement. In this exemplary embodiment of the invention the rotatable support 52 is capable of moving from the solid line position illustrated to the dotted line position illustrated at 56 for an exemplary distance as indicated at 57 to thereby compensate for a corresponding relative axial movement between the adjacent ends of the rotatable conductor 26 and the nonrotatable conductor 27.

As previously indicated, the expansion joint 30 comprises rotating means for rotating one of the supports relative to the other and one example of the rotating means comprising the expansion joint 30 is illustrated in exploded perspective view in FIG. 5 and designated generally by the reference numeral 59. The rotating means 59 comprises a first member shown as a rod 60 having a male helical thread 61 provided thereon and a second member which is in the form of an elongated tubular member 62 extending the major portion of the distance between the supports 52 and 53. The tubular member 62 has a substantially right circular cylindrical peripheral outline and has cooperating guide means which may be provided in a guide member 63 fixed to the member 62 adjacent its outer end and as indicated at 64. The guide means comprises substantially tubular surface means 65 of approximately square cross-section outline and the surface means or tubular surface 65 is adapted to receive the male helical thread 61 therewithin.

Each of the supports 52 and 53 comprises an inner supporting plate 70 having a circular peripheral outline and a substantially tubular transition member 71 fixed to the outer surface of the plate 70 and having substantially frustoconical inner and outer surfaces which are designated by the reference numerals 72 and 73 respectively. Each plate 70 has a plurality of spaced openings 74 provided therein and corresponding in number to the plurality of electrical leads 55 and in this example of the invention each spaced opening 74 is arranged with its center on a circle concentric with a central axis 75 through the expansion joint 30. Each of the electrical leads 55 with a helical pattern provided therein has a terminal end portion thereof inserted within an associated opening 74 in its associated plate 70 and is suitably fixed thereto as by a weld indicated at 76.

Each rod 60 has a threaded end portion 80 provided with a square shank-like portion 81 which is adapted to be received within a square opening 82 in its associated plate 70. The square portion 81 prevents the rod 60 from rotating relative to its plate 70 and a threaded nut 83 is used to fasten the rod 60 in position against the plate 70.

The elongated tubular member 62 fixed to the support 53 is preferably fixed to the plate 70 of support 53 by extending through a cooperating opening 84 provided in its associated plate 70 and is then suitably welded in position thereagainst. The guide member 63 with its guide surface 65 is fastened to the tubular member 62 and is in the form of an insert which is inserted in the outer end portion of the elongated tubular member 62 and fixed thereto by a plurality of threaded screws 85 extending through associated openings 86 in the tubular member 62 and cooperating threaded openings 90 in the insert member 63.

Relative axial movement of the rotatable conductor 26 and nonrotatable conductor 27 toward and away from each other causes the helical thread 61 to engage the tubular guide surface 65 and causes the rotatable support 52 to rotate relative to the support 53 which is fixed to the nonrotatable electrical conductor 27. Rotation of the support 52 causes the rotatable conductor 26 to rotate therewith. Thus, a portion of the relative axial movement between associated ends of the conductors 26 and 27 as caused by differential expansion and contraction of the conductors 26 and 27 relative to the conduit 21 is converted to relative rotation between the supports 52 and 53 to thereby change the relative axial positions of the supports 52 and 53 and rotate the rotatable conductor 26.

As the supports 52 and 53 are relatively rotated the electrical leads 55 arranged in a predetermined helical pattern around the outside right circular cylindrical surface of the tubular member 62 are held tightly against such outside surface, although the pitch of each lead 55 is changed, and such outside surface serves to maintain a constant diameter for the electrical leads 55 irrespective of the axial distance between the supports 52 and 53. This feature assures that irrespective of the expansion and contraction of the conductors 26 and 27 with respect to their outside protective conduit 21 the expansion joint 30 will operate within the maximum diameter across its helically wound electrical leads 55 and as indicated at 91 and well within the diameter of the plates 70 comprising the supports 52 and 53.

As seen particularly in FIG. 3 each substantially tubular frustoconical transition member 71 comprising the supports 52 and 53 has its comparatively large diameter end fixed to its associated plate 70 outwardly of the electrical leads 55 and as indicated at 84. Each transition member 71 has its small diameter end fixed to an associated electrical conductor 26 or 27 and as indicated in each instance by the reference numeral at 84. In addition, it will be noted that the electrical conductors 26 and 27 are in the form of tubular conductors each having a central passage 86 extending therethrough and each member 71 may have an annular shoulder 90 provided therein adjacent its terminal outer end which is received in an associated passage 86 and serves to align the particular member 71 and enable the welding of the member 71 in a substantially symmetrical manner about the axis 75 of the expansion joint 30.

The expansion joint 30 also has a cylindrical anticorona discharge shield 94 suitably held in position around its circular plates 70. The plate 70 comprising the support 52 has an annular groove 95 provided therein so that it extends radially inwardly toward the center of such plate. The plate 70 associating with the support 53 has a plurality of threaded holes 96 extending radially inwardly from the outer periphery thereof. The threaded holes 96 are adapted to receive fastening screws 100 which extend through cooperating openings provided adjacent a terminal end of the anticorona discharge shield 94 to thereby fasten such discharge shield to the plate 70 of support 53. The annular groove 95 in the oppositely arranged plate 70 has an antifriction annular ring such as a plastic ring 101 and the ring 101 provides wear resistance between the shield 944 and its associated plate 70 during relative axial and rotating movements between the plates 70 and hence supports 52 and 53.

As previously indicated, each central spacer 31 has a plurality of openings 50 which are provided to enable the flow of an inert gas along the length of the outer protective conduit 21. In this example of the invention certain ones of the openings 50 are utilized to extend an associated threaded bolt 42 therethrough and fasten the particular central spacer 31 of a conductor 27 to its associated annular flange 41.

Another exemplary embodiment of rotating means for the expansion joint of this invention is illustrated in FIG. 6 of the drawings. The rotating means illustrated in FIG. 6 is very similar to the rotating means 59; therefore, such rotating means will be designated generally by the reference numeral 59A and parts thereof which are similar to corresponding parts of the rotating means 59 will be designated by the same reference numerals as in the rotating means 59 also followed by the letter designation A and not described again. Only those component parts which are substantially different from corresponding parts of the rotating means 59 will be designated by a new numeral also followed by the letter designation A and described in detail.

The rotating means 59A comprises a first member or rod 103A of circular cross-sectional configuration with a male helical thread 61A provided about the outer periphery thereof. The guide means comprising the rotating means 59A comprises what will be referred to as a guide nut 104A fixed to the outer end of tubular cylindrical member 62A by threaded screws 85A. The nut 104A has female helical threads 105A formed therein for cooperation with the male helical threads 61A of the member 103A for a similar purpose as described in detail in connection with the rotating means 59. The rotating means 59A may be used interchangeably with the rotating means 59 to define the expansion joint 30, as desired.

As previously mentioned, each expansion joint 30 illustrated in the drawings has been designated generally by the reference numeral 30. However, it will be appreciated that each rotatable conductor 26 has a pair of expansion joints 30 associated with its opposite ends and such pair of expansion joints have their component portions spiraled in opposite directions.

In particular, it will be seen from the illustration at 110 in FIG. 1 that the helical thread 61, electrical leads 55, etc., are spiraled in an opposite direction from corresponding components of the expansion joint 30 indicated at 111 at the opposite end of the rotatable conductor 26. With this construction it will be appreciated that as the conductors 26 and 27 expand or contract relative to the outer housing 21 the net effect is to rotate each rotatable conductor 26 in one direction or the other respectively so for each direction of rotation its opposite ends move in opposite directions and either toward or away from an adjoining conductor 27. If the expansion joints 30 at opposite ends of the rotatable conductor 26 were to be spiraled in the same direction in the power transmission system 20, differential expansion or contraction of the conductors 26 and 27 relative to the conduit 21 would cause the expansion joints 30 to impose high torsional stresses in each rotatable conductor 26 rather than compensating for only differential expansion or contraction.

In this disclosure of the invention the cylindrical member 62 is shown as being associated with a non-rotatable electrical conductor 27 with the rod 60 being associated with a rotatable conductor 26. However, it will be appreciated that the rod 60 may comprise a portion of the nonrotatable support 53 and be fixed to a conductor 27 and the cooperating cylindrical member 62 with its guide surface 65 may comprise a portion of the rotatable support 52 and be fixed to a rotatable conductor 26, as desired.

The electrical conductors 26 and 27, expansion joints 30, and anticorona discharge shield 94 may be made of any suitable electrically conductive material and materials containing aluminum have been successfully utilized. Further, the outer protective conduit 21 with its conduit sections 22 may be made of any suitable protective material whether metallic or nonmetallic.

The electrical leads 55 comprising the expansion joint 30 may be electrically insulated or uninsulated along their full lengths except at their terminal end portions where they are electrically connected to their associated plates 70. Further, it will be appreciated that different materials may be used to make the electrical conductors 26 and 27 and the electrical leads 55 provided that the total conductivity or current carrying capacity of the leads 55 comprising each expansion joint 30 is equal to or greater than the conductivity or current carrying capacity of each electrical conductor 26 or 27. Further, each lead 55 may be made of a single wire or a plurality of wires suitably bunched together.

In this example of the invention nine electrical leads 55 are shown extending in a spiral or helical pattern between associated supporting plates 70 and each lead 55 is spaced from the other and extends in a helical path wherein one end is initially rotated 270° with respect to its other end. However, it will be appreciated that the material to be used in making each lead, cross-sectional area and length of each lead, amount that each lead is to be spiraled, etc., should be determined for each individual application to assure that the expansion joint 30 provides adequate compensation for differential expansion and contraction as well as assure that the combined total conductivity of the helically arranged electrical leads 55 is equal to or greater than the conductivity of each electrical conductor 26 or 27.

However, irrespective of the amount which each electrical lead 55 spirals it will be appreciated that with relative movement of the plates 70 due to expansion and contraction the net effect is to tighten or loosen the spiral around the outer periphery of the tubular cylindrical member 62 while the maximum diameter 91 of the electrical leads 55 remains substantially constant and the overall expansion joint may be housed within a protective conduit 21 of comparatively small inside diameter. Also, the conduit 21 may be made of substantially identical comparatively small diameter conduit sections 22 which may be fastened together in a simple and economical manner.

The power transmission system 20 of this invention with its housed electrical conductors 26 and 27 and expansion joints 30 may be used above ground, underground, and under water, as desired.

What is claimed is:

1. An expansion joint for electrically connecting associated ends of a pair of electrical conductors while allowing relative movement therebetween, said expansion joint comprising, a pair of spaced supports each fixed to an associated one of said electrical conductors, a plurality of elongated electrical leads having their opposite ends fastened to said spaced supports, and each being initially arranged in a helical pattern having a given pitch, and means rotating one of said supports and its adjoining electrical conductor relative to the other with relative axial movement of said conductors to modify the distance between said supports and cause the pitch in the helical pattern in each electrical lead to vary as a function of said distance and thereby compensate for said relative axial movement.

2. An expansion joint as set forth in claim 1 in which said rotating means comprises a first member attached to one of said supports and having a male helical thread provided at its outer end and a second member attached to the other of said supports and having cooperating guide means adjacent its outer end receiving said male helical thread therewithin, said male helical thread and guide means cooperating to relatively rotate said supports with said relative axial movement.

3. An expansion joint as set forth in claim 2 in which one of said members comprises an elongated member of substantially right circular cylindrical outline extending the major portion of the distance between said supports, said elongated member having said electrical leads wound against its outside diameter and serving to maintain a substantially constant diameter for said electrical leads irrespective of the axial distance between said supports.

4. An expansion joint as set forth in claim 2 in which said first member has a central portion of substantially square cross-sectional configuration with said male helical thread being provided about the outer periphery thereof and said guide means comprises surface means of approximately square cross-sectional outline and providing minimum frictional drag between said helical thread and said guide means.

5. An expansion joint as set forth in claim 3 in which said first member has a central portion of substantially circular cross-sectional configuration with said male helical thread being provided about the outer periphery thereof and said guide means comprises a guide nut fixed to said outer end of said second member and having female helical threads formed therein for cooperation with said male helical threads.

6. An expansion joint as set forth in claim 3 in which said elongated member defines said second member and is in the form of an elongated tubular member having its inner end fixed to said other support and having an insert attached thereto adjacent its outer end, said insert having said guide means defined therein.

7. An expansion joint as set forth in claim 6 in which each of said supports comprises an inner portion having a circular peripheral outline and having a plurality of spaced openings provided therein and corresponding in number to said plurality of leads, said spaced openings being arranged with their centers on a circle arranged inwardly of the circumference of said support, and each of said leads having a terminal end portion inserted within an opening in an associated support and being fixed thereto.

8. An expansion joint as set forth in claim 1 in which each of said supports comprises an inner portion having a circular peripheral outline and each of said plurality of electrical leads has an end fixed to an associated support on a circle arranged inwardly of the circumference of said support.

9. An expansion joint as set forth in claim 8 in which each of said supports has an outer portion of substantially frustoconical peripheral outline and the small diameter end of each frustoconical outer portion is fixed to an associated conductor.

10. An expansion joint as set forth in claim 1 in which each of said supports comprises an inner supporting plate having a circular peripheral outline and a tubular transition member fixed to said plate and having substantially frustoconical inner and outer surfaces, said plurality of said electrical leads having each end fixed to an associated plate on a circle spaced inwardly from the circumference of the associated plate, and said transition member having its large diameter end fixed to its associated plate outwardly of the electrical leads fixed thereto and its small diameter end fixed to an associated conductor.

11. An expansion joint as set forth in claim 10 in which each of said plates has a plurality of spaced openings provided therein and corresponding in number to said plurality of leads with each spaced opening being arranged with its center on a circle concentric with a central axis through said expansion joint and each of said leads having a terminal end portion inserted within an opening in its associated plate and fixed thereto.

12. An electrical power transmission system comprising; an outer protective conduit; a plurality of rotatable and nonrotatable elongated electrical conductors supported in electrically insulated relation within said conduit and arranged in an alternating end-to-end relation; and a plurality of expansion joints electrically connecting said electrical conductors together; each expansion joint connecting associated ends of a rotatable and a nonrotatable electrical conductor and each expansion joint comprising, a pair of spaced supports with one support being fixed to said rotatable electrical conductor and the other support being fixed to said nonrotatable conductor, a plurality of elongated electrical leads having their opposite ends fastened to said spaced supports and each being initially arranged in a helical pattern having a given pitch, and means rotating said one support and its adjoining rotatable electrical conductor relative to the other support with relative axial movement of said rotatable and nonrotatable conductors to modify the distance between said supports and cause the pitch in the helical pattern in each electrical lead to vary as a function of said distance and thereby compensate for said relative axial movement.

13. A power transmission system as set forth in claim 12 in which said rotating means comprises a first member attached to one of said supports and having a male helical thread provided at its outer end, a second member attached to the other of said supports and having a cooperating guide means attached to its outer end receiving said male helical thread therewithin, said male helical thread and guide means cooperating to relatively rotate said supports with said relative axial movement.

14. A power transmission system as set forth in claim 13 in which one of said members comprises an elongated member of substantially right circular cylindrical outline extending the major portion of the distance between said supports, said elongated member having said electrical leads wound against its outside diameter and serving to maintain a constant diameter for said electrical leads irrespective of the axial distance between said supports.

15. A power transmission system as set forth in claim 12 and further comprising a central spacer fixed to the central portion of each conductor and being held at an associated axial position within said conduit to assure axial expansion and contraction of each conductor occurs in opposite directions from opposite sides of its central spacer to hold each conductor against axial creeping along said conduit, each nonrotatable conductor being fixed to said conduit at its associated axial position by fixing its central spacer thereto, and each rotatable conductor having its central spacer confined at its associated axial position while allowing rotation thereof relative to said conduit to thereby allow rotation of the rotatable conductor.

16. A power transmission system as set forth in claim 15 in which each rotatable conductor has a pair of said plurality of expansion joints associated with its opposite ends, said pair of expansion joints having their component portions spiraled in opposite directions to prevent the creation of internal torsional stresses within said rotatable conductor and assure said expansion joints take care of differential expansion between said conduit and said end-to-end electrical conductors.

17. A power transmission system as set forth in claim 16 and further comprising an intermediate electrical insulating spacer fixed to each electrical conductor at spaced intervals between each central spacer and an adjacent expansion joint, each intermediate spacer supporting its associated conductor substantially centrally within said conduit while allowing movement thereof within said conduit.

18. A power transmission system as set forth in claim 17 in which each of said spacers has a plurality of passages extending therethrough with selected ones of the passages in each central spacer for each nonrotating conductor being used to fasten the particular central spacer and its nonrotating conductor to said conduit, and said system further comprising an inert gas under pressure carried within said conduit and filling the volume between each electrical conductor and expansion joint and said conduit, said inert gas being free to flow through said passages to provide improved electrical insulation and cooling along the full length of each electrical conductor and its expansion joints.

19. A power transmission system as set forth in claim 16 in which said conduit has a substantially uniform cross-sectional outline throughout its length and is comprised of a plurality of conduit sections fixed together in end-to-end relation; each expansion joint has a comparatively small diameter substantially smaller than the inside diameter of said conduit, and further comprising an electrical insulating fluid carried within said conduit and filling the volume between each electrical conductor and expansion joint and said conduit, said fluid providing electrical insulation along the full length of each electrical conductor and expansion joint and serving to dissipate heat away therefrom.

20. A power transmission system as set forth in claim 16 in which each of said supports of each expansion joint comprises an inner supporting plate having a circular peripheral outline and a tubular transition member fixed to said plate and having substantially frustoconical inner and outer surfaces, said plurality of said electrical leads having each end fixed to an associated plate on a circle spaced inwardly from the circumference of the associated plate, each transition member having its large diameter end fixed to its associated plate outwardly of the electrical leads fixed thereto and its small diameter end fixed to an associated conductor, and said plurality of electrical leads having a combined conductivity which is not less than the conductivity of each electrical conductor.

References Cited

UNITED STATES PATENTS

| 409,181 | 8/1889 | De Ferranti. |
| 3,325,588 | 6/1967 | Lear. |
| 3,389,213 | 8/1968 | Niemoller. |

DARRELL L. CLAY, Primary Examiner

U.S. Cl. X.R.

174—86, 88